(12) United States Patent
Thut et al.

(10) Patent No.: US 8,528,264 B1
(45) Date of Patent: Sep. 10, 2013

(54) WALL MOUNT HUMAN MACHINE INTERFACE

(75) Inventors: Gary M. Thut, Willowick, OH (US); Steve Jopek, Twinsburg, OH (US)

(73) Assignee: Pepperl+Fuchs GmbH, Mannheim (DE)

( * ) Notice: Subject to any disclaimer, the term of this patent is extended or adjusted under 35 U.S.C. 154(b) by 63 days.

(21) Appl. No.: 13/349,665

(22) Filed: Jan. 13, 2012

Related U.S. Application Data

(60) Provisional application No. 61/434,518, filed on Jan. 20, 2011.

(51) Int. Cl.
  *E04H 14/00* (2006.01)

(52) U.S. Cl.
  USPC ............................... 52/27; 52/29

(58) Field of Classification Search
  USPC ............ 52/27, 28, 29, 32, 34, 36.1, 36.4, 52/36.5
  See application file for complete search history.

(56) References Cited

U.S. PATENT DOCUMENTS

| | | |
|---|---|---|
| 1,027,397 A | 5/1912 | Adam |
| 3,175,873 A | 3/1965 | Blomquist et al. |
| 3,247,312 A | 4/1966 | Adel |
| 3,346,310 A | 10/1967 | Diack |
| 3,697,723 A | 10/1972 | Winsler et al. |
| 3,707,732 A | 1/1973 | Cosper |
| 3,771,264 A | 11/1973 | Sawle |
| 3,886,686 A | 6/1975 | Urbanick |
| 3,912,348 A | 10/1975 | Seymour |
| 4,056,211 A | 11/1977 | Zumwalt |
| 4,057,170 A | 11/1977 | Dougherty |
| 4,134,625 A | 1/1979 | Palka |
| 4,572,240 A | 2/1986 | Van Becelaere |
| 4,579,354 A | 4/1986 | Vassallo et al. |
| 4,667,580 A | 5/1987 | Wetzel |
| 4,691,970 A | 9/1987 | Neri |
| 4,725,515 A | 2/1988 | Jurca |
| 4,857,668 A | 8/1989 | Buonanno |
| 4,888,919 A | 12/1989 | Strosberg et al. |
| 4,902,023 A | 2/1990 | Opresko et al. |
| 4,961,762 A | 10/1990 | Howeth |
| 4,998,587 A | 3/1991 | Thomas |
| 5,068,493 A | 11/1991 | Benn, Sr. et al. |
| 5,079,882 A | 1/1992 | Bahout |

(Continued)

OTHER PUBLICATIONS

Carlon® Zip Box® Blue™ Switch and Outlet Boxes, 22 pages, © Lamson & Sessions 2006.

(Continued)

*Primary Examiner* — Mark Wendell
(74) *Attorney, Agent, or Firm* — Fay Sharpe LLP

(57) ABSTRACT

Disclosed is a wall mount enclosure for mounting in a wall, including a housing with a front side, a back side and at least one side wall defining an interior accessible from an opening in the front side, where the front side has an outer perimeter extending outwardly beyond the side wall to interface with a front surface of the wall when a plurality of clamping mechanisms are engaged to mount the enclosure to the wall. The clamping mechanisms comprising a threaded fastener having a head accessible through the interior, and an at least partially threaded elongated member. A clamp body is provided and is pivotal about an axis by pivoting the threaded fastener in a first direction away from the interior of the enclosure and linearly translatable when in a second pivotal position to engage a back portion of the wall and mount the housing.

15 Claims, 8 Drawing Sheets

(56) References Cited

U.S. PATENT DOCUMENTS

| | | | |
|---|---|---|---|
| 5,171,078 A | 12/1992 | Oslin et al. | |
| 5,247,798 A | 9/1993 | Collard, Jr. | |
| 5,296,803 A | 3/1994 | Kirby et al. | |
| 5,355,627 A | 10/1994 | Katz | |
| 5,464,475 A | 11/1995 | Sikes et al. | |
| 5,574,254 A | 11/1996 | Mori et al. | |
| 5,915,575 A | 6/1999 | Morris, Sr. | |
| 5,954,411 A | 9/1999 | Katz | |
| 6,007,171 A | 12/1999 | Varellas-Olree | |
| 6,170,928 B1 | 1/2001 | Eardley et al. | |
| 6,189,268 B1 * | 2/2001 | Carr et al. | 52/36.1 |
| 6,230,907 B1 * | 5/2001 | Stuart | 211/90.01 |
| 6,253,497 B1 * | 7/2001 | Gekler et al. | 52/27 |
| 6,286,918 B1 | 9/2001 | King | |
| 6,588,543 B1 | 7/2003 | Tchilinguirian | |
| 6,648,750 B1 | 11/2003 | Wiseman | |
| 6,669,041 B2 | 12/2003 | Almond | |
| 6,733,095 B1 | 5/2004 | Rieb | |
| 6,775,593 B1 | 8/2004 | Parker et al. | |
| 7,111,889 B2 | 9/2006 | Pennerath | |
| 7,140,618 B2 | 11/2006 | Valls, Jr. | |
| 7,210,729 B2 | 5/2007 | Hammaker et al. | |
| 7,423,217 B2 | 9/2008 | Pape et al. | |
| 7,595,446 B2 | 9/2009 | Turcovsky et al. | |
| 7,631,850 B2 | 12/2009 | Lee et al. | |
| 7,777,132 B2 | 8/2010 | Ozawa et al. | |
| 8,136,279 B1 | 3/2012 | Nearman et al. | |
| 2003/0070404 A1 | 4/2003 | Calabrese | |
| 2005/0104484 A1 | 5/2005 | Landsberger et al. | |
| 2007/0145871 A1 | 6/2007 | Christie | |
| 2007/0169953 A1 | 7/2007 | Pape et al. | |
| 2007/0169955 A1 | 7/2007 | Pape et al. | |
| 2007/0194180 A1 | 8/2007 | Korcz | |

OTHER PUBLICATIONS

Air Conditioning & Refrigeration Industry Sections, http://www.plasopan.com/sections/cooler-section.gif, Feb. 14, 2011.

Command Series Strategic Loop Controller, type SLC 1, Bailey Product Instruction, E92-530-1, Jul. 31, 1994.

ES18-010-S60-Profiles-Rubber Product data sheet-Elasto Proxy, http://www.elastoproxy.com/pages/our_products/ProductDataSheet.aspx?LANG-EN-CA . . . , Feb. 14, 2011.

ES16-082-E60-Profiles-Rubber Product data sheet-Elasto Proxy, http://www.elastoproxy.com/pages/our_products/ProductDataSheet.aspx?LANG=EN-CA . . . , Feb. 14, 2011.

ES18-256-S60-Profiles-Rubber Product data sheet-Elasto Proxy, http://www.elastoproxy.com/pages/our_products/ProductDataSheet.aspx?LANG=EN-CA . . . , Feb. 14, 2011.

Extrusion Profiles Cord Stock & Sheet Material, Newman Sanitary Gasket Company, www.newmangasket.com, Newman Sanitary Gasket Company, 2010.

www.simolexrubber.com, Apr. 11, 2004.

\* cited by examiner

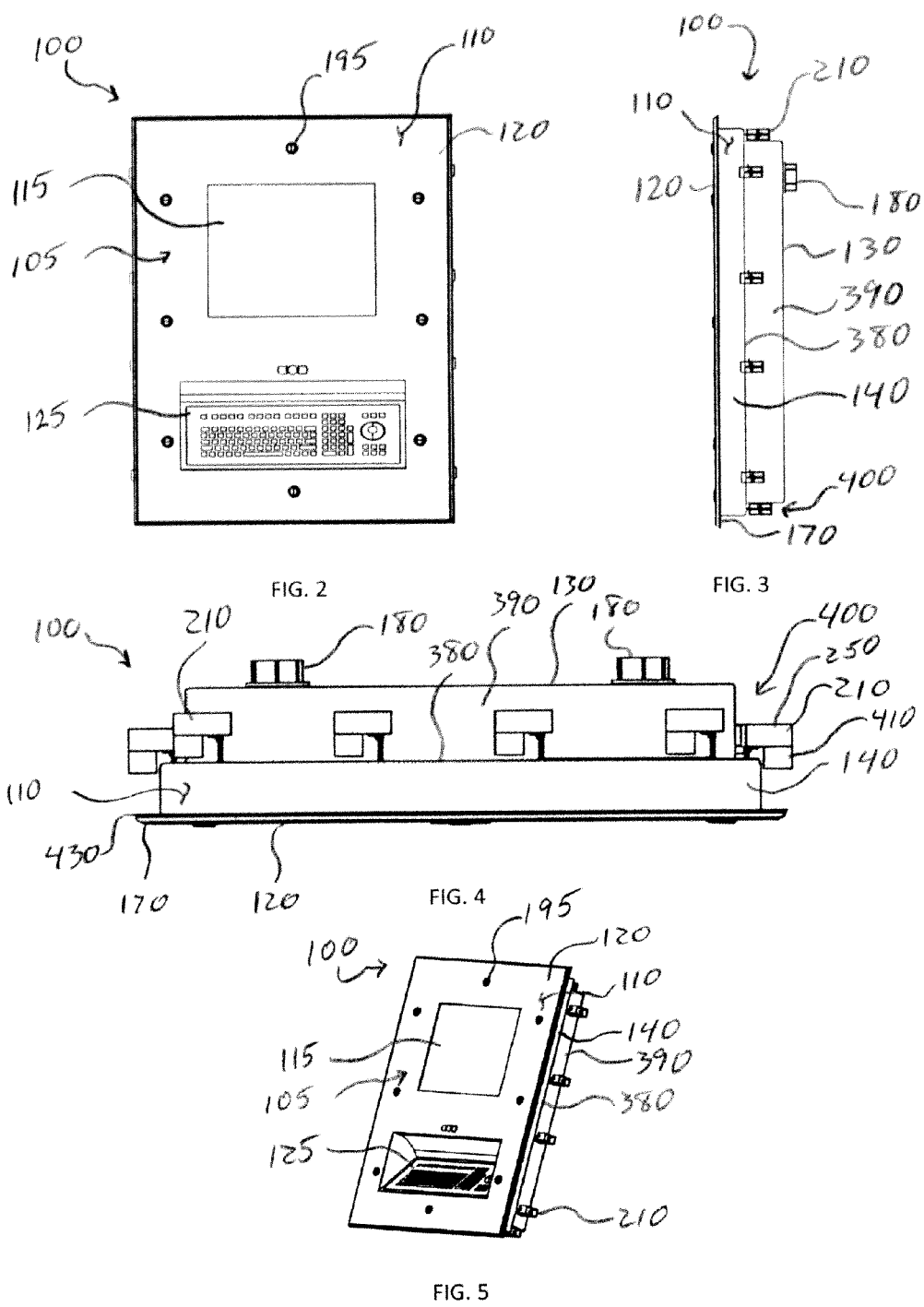

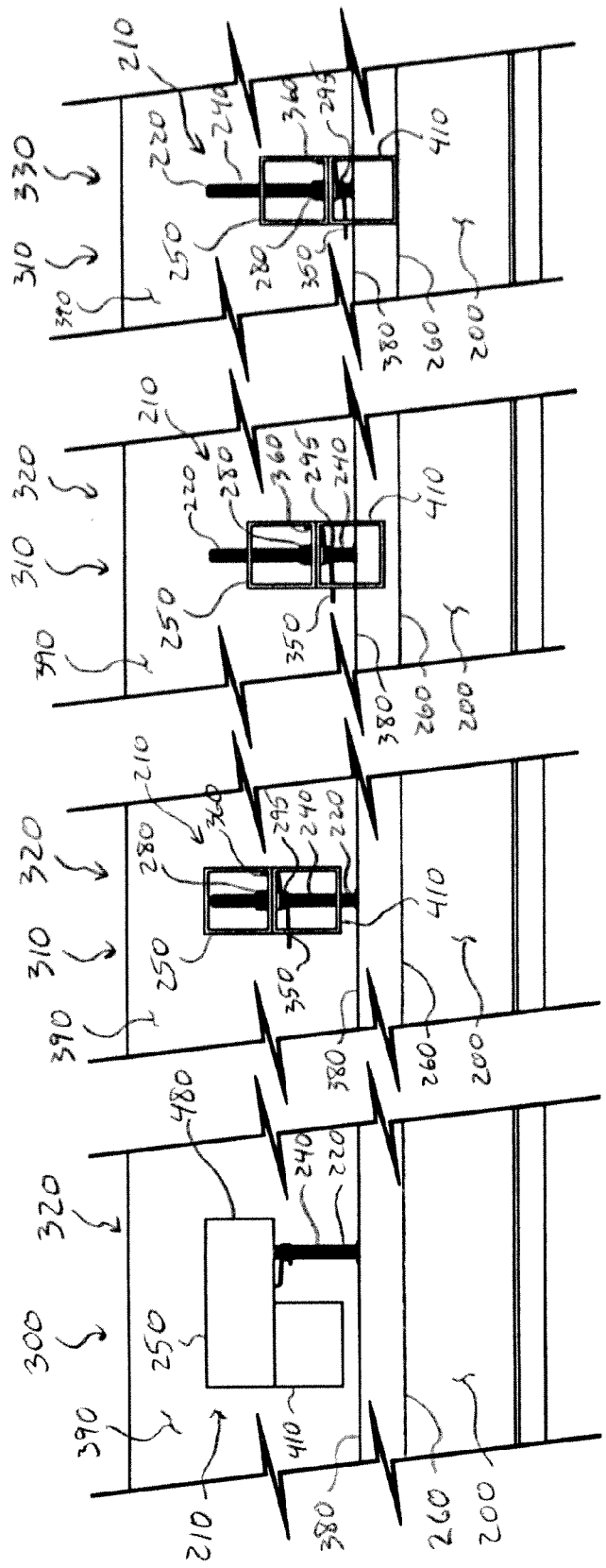

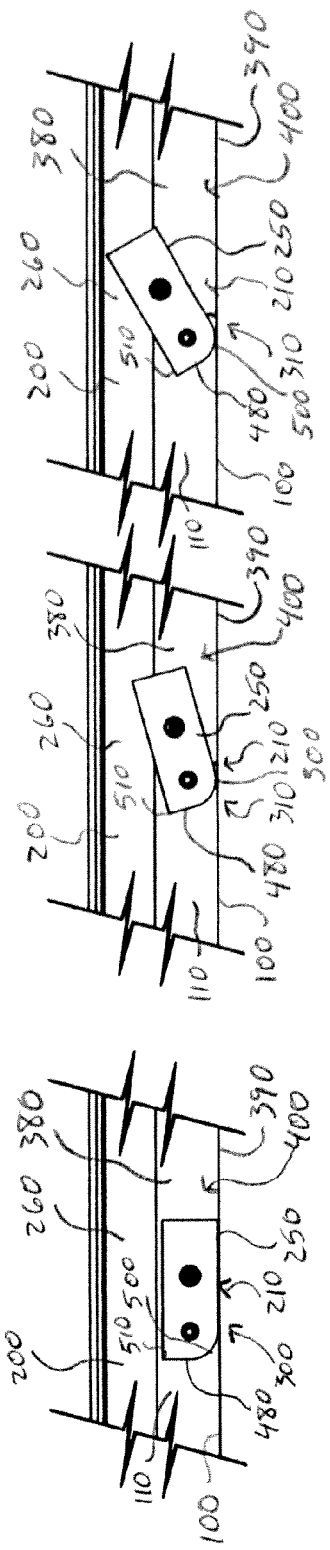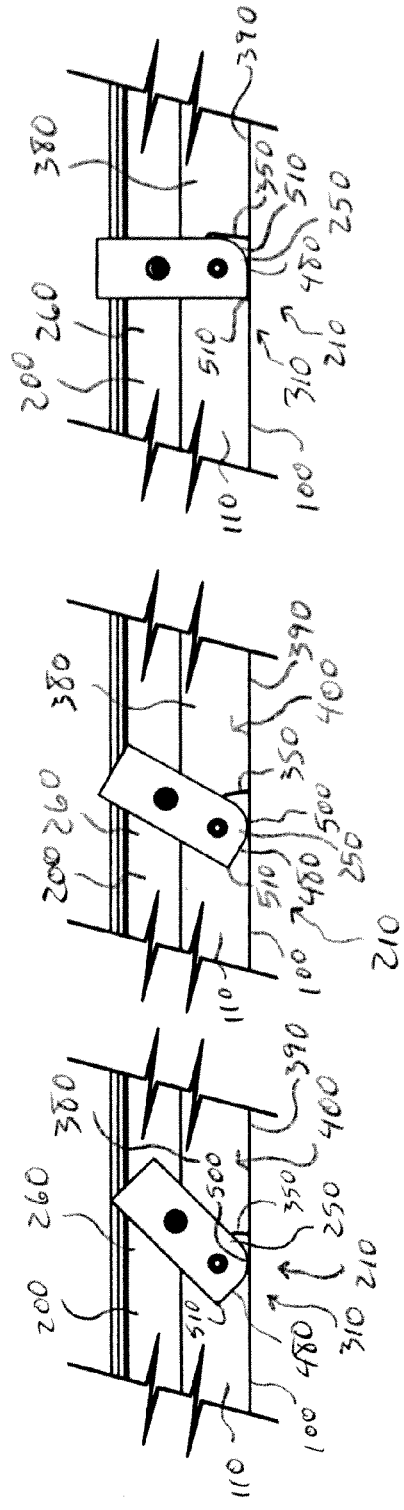
FIG. 19 FIG. 20 FIG. 21 FIG. 22 FIG. 23 FIG. 24

WALL MOUNT HUMAN MACHINE INTERFACE

This application claims priority from and the benefit of U.S. Provisional Patent Application Ser. No. 61/434,518 filed Jan. 20, 2011, the entirety of which is hereby incorporated by reference.

BACKGROUND

The present exemplary embodiment relates to a wall mount human machine interface. It finds particular application in conjunction with enclosures and clamping mechanisms to mount a human machine interface or other electrical components to an associated wall structure, and will be described with particular reference thereto. However, it is to be appreciated that the present exemplary embodiment is also amenable to other like applications.

Precise instrumentation associated with modern complex systems are sometimes required to be located in unfavorable environments. This is particularly true for electrical equipment as it is typically required that various services within building structures be provided with a means of control that remains isolated from other areas of the building. Additionally, precise instrumentation may be required in a location of a building that requires a controlled atmosphere.

Controlled atmospheres are usually a requirement of certain medical facilities or manufacturing plants to maintain a measured level of air quality in a defined location. Notably, the area within a controlled atmosphere must consistently be monitored to ensure that the necessary level of air quality is maintained. As such, it is desirable to design a controlled atmosphere with efficient use of space to reduce the possibility of unwanted air pollutants.

Further, it may be necessary to provide a human machine interface (HMI) device or other related components within the controlled atmosphere to allow human manipulation of a controllable system or device therein. A typical HMI device comprises electrical elements within a housing having an input device such as a keypad and an output device such as a display screen. Additionally, HMI devices include electrical hookup ports for at least one connection to an associated data or power source. However, installation of an HMI device, electrical elements or an enclosure in the controlled atmosphere may increase the risk of accumulating unwanted elements such as moisture, bacteria, dust and other air particulate that is not easily controlled or monitored within the controlled atmosphere.

The efficient use of space within a controlled atmosphere has prompted others in the art to mount HMI devices and enclosures on or within the walls of the controlled atmosphere. However, these attempts either fail to reduce the risk of accumulating foreign air elements and/or fail to provide for efficient access to the enclosure for maintenance and replacement.

In one instance, it is known to install an enclosure within a wall opening, the enclosure having an opening at a front side to provide access to an interior and an opening at a back side to provide access to a back portion of an associated wall. This arrangement allows the enclosure to be installed within the associated wall of a controlled environment without having residual mechanical fittings or cracks about the front side and thereby reduces the accumulation of unwanted air particulate. However, it requires the use of additional space adjacent the back portion of the associated wall for access to mechanical fittings for securing the enclosure within the associated wall.

Therefore there remains a need to provide an enclosure and a method of installing an enclosure within a controlled atmosphere to reduce the risk of uncontrollable accumulation of air particulate therein. Additionally, there remains a need for a clamping mechanism within an enclosure to allow for efficient placement and maintenance of an enclosure on an associated wall within a controlled atmosphere.

BRIEF DESCRIPTION

The present disclosure relates to a wall mount enclosure for mounting in an opening of an associated wall. The enclosure comprises a housing with a front side, a back side and at least one side wall, where the side wall extends between the front and back sides and defines an interior that is accessible from an opening in the front side. The sidewall includes a first sidewall portion extending from the front side toward the backside and defining a sidewall perimeter, as well as a second side wall portion extending from the backside toward the front side and located entirely inward of the sidewall perimeter, where no portion of the first sidewall portion is laterally inward of any portion of the second side wall portion. In addition, the sidewall includes a third sidewall portion joining the first and second sidewall portions. The front side has an outer perimeter with at least a portion of the outer perimeter extending outwardly beyond the side wall to interface with a front surface of the associated wall when the housing is installed in the wall opening.

The enclosure also includes clamping mechanisms mounted to the enclosure outward of the second sidewall portion, which are operative to mount the enclosure to the associated wall. At least one of the clamping mechanisms includes a threaded fastener and a clamp body. The fastener has a head accessible through the interior of the enclosure, and an elongated member that is at least partially threaded. When the fastener is rotated in a first rotational direction, the clamp body pivots in a first pivotal direction for movement of at least a portion of the clamp body away from the interior of the enclosure between a first pivotal position in which the clamp body is entirely located inward of the side wall and a second pivotal position in which at least a portion of the clamp body is outward of the side wall. When in the second pivotal position, the clamp body is translatable by continued rotation of the threaded fastener in the first rotational direction between an extended position in which the clamp body is spaced from the associated wall and a retracted position in which the clamp body operatively engages a back portion of the associated wall to mount the housing to the associated wall.

The front surface of the enclosure includes an outer perimeter in certain embodiments having a gasket to sealingly engage at least a portion of the front portion of the associated wall when the clamping mechanism has engaged the back portion of the associated wall.

Certain embodiments of this configuration may be advantageously employed to facilitate installation of the enclosure entirely from one side of the associated wall by operation of one or more of the clamping mechanism fasteners accessed from within the enclosure interior. More particularly, the clamping mechanism may further comprise a resilient or biasing member operative to pivotally urge the clamp body inwards towards the enclosure. Additionally, the elongated member may be attached to the clamp body and rotatable along a common axis. Here, the clamp body may be provided with a lock nut that is rigidly connected therein to engage at least some threads of the elongated member. The lock nut having threads with a nylon insert to engage at least some threads along the elongated member.

In another embodiment, an abutment surface is provided to engage the clamp body as the threaded fastener is rotated to discontinue rotational movement of the clamp body relative to the enclosure. The abutment surface may comprise a straight edge portion of the clamp body that abuts one side of the clamp body to the enclosure. The clamp body may begin linear translation relative to the threaded fastener in a direction towards the back portion of the associated wall after the clamp body engages the abutment surface. The clamp body can engage the abutment surface at a 90 degree angle relative to the enclosure.

In yet another embodiment, the at least one clamping mechanism accommodates a clamp extension at an engagement side of the clamp body extending the clamp body towards the back portion of the associated wall.

In one embodiment, the clamping mechanism is captive to the enclosure wherein the elongated member includes a recess to receive a restrictor plate to at least partially restrict axial motion and allow pivotal motion of the threaded fastener in relation to the enclosure.

The enclosure is directed to house or store electronic elements or equipment such as a control station, a user interface unit and a human machine interface device. However, the enclosure can also be used to house or store any elements that can be arranged to fit within the interior. To account for electric elements at least one electrical port extends from the enclosure for operable connection to an associated power source or data source.

A method is provided for sealingly connecting a wall mount enclosure to an associated wall. The method includes providing a cutout in the associated wall, the cutout sized to accept a housing having a front side and a back side and at least one side wall, the side wall extending between the front side and the back side defining an interior accessible through an opening in the front side, the front side having an outer perimeter extending outwardly beyond the at least one side wall. The step of placing the housing within the cutout, the outer perimeter engaging at least a portion of a front surface of the associated wall.

Pivoting a plurality of clamping mechanisms from a first position inward of the side wall to a second position outward of the side wall. Linearly translating a clamp body of the clamping mechanism from an extended position to a retracted position until the clamp body abuttingly engages a back portion of the associate wall. Compressing at least a portion of a gasket located at least partially between the outer perimeter of the front side and the front surface of the associated wall.

A clamping mechanism operative to mount an enclosure to an associated wall, the clamping mechanism comprising a threaded fastener having a head accessible through an interior of the enclosure, and an at least partially threaded elongated member. A clamp body is provided and can pivot about an axis by rotation of the threaded fastener in a first rotational direction for movement of at least a portion of the clamp body in a first pivotal direction away from the interior of the enclosure between a first pivotal position and a second pivotal position. The clamp body translatable when in the second pivotal position by continued rotation of the elongated member in the first rotational direction. The clamp body is translatable between an extended position in which the clamp body is spaced from the associated wall and a retracted position in which the clamp body operatively engages a back portion of the associated wall to mount the housing therein.

Still other features and benefits of the present disclosure will become apparent from the following detailed description.

BRIEF DESCRIPTION OF THE DRAWINGS

FIG. 2 is a plan view of a front side of a wall mount enclosure with a human machine interface device;

FIG. 3 is a side view of the wall mount enclosure and a plurality of clamping mechanisms;

FIG. 4 is a top view of the wall mount enclosure and the plurality of clamping mechanisms;

FIG. 5 is a perspective view of the wall mount enclosure with the human machine interface device and the plurality of clamping mechanism;

FIG. 15 is a side view of one embodiment of the clamping mechanism in a first pivotal position;

FIG. 16 is a side view of one embodiment of the clamping mechanism in a second pivotal position;

FIG. 17 is a side view of one embodiment of the clamping mechanism partially between an extended position and a retracted position;

FIG. 18 is a side view of one embodiment of the clamping mechanism in the retracted position;

FIG. 19 is a top view of one embodiment of the clamping mechanism in the first pivotal position;

FIG. 20 is a top view of one embodiment of the clamping mechanism with rotation in a first pivotal direction outward from a side wall in the second pivotal position;

FIG. 21 is a top view of one embodiment of the clamping mechanism further rotating in the first pivotal direction outward from the side wall in the second pivotal position;

FIG. 22 is a top view of one embodiment of the clamping mechanism with continued rotation in the first pivotal direction outward from the side wall in the second pivotal position;

FIG. 23 is a top view of one embodiment of the clamping mechanism with continued rotation in the first pivotal direction outward from the side wall in the second pivotal position;

FIG. 24 is a top view of one embodiment of the clamping mechanism with continued rotation in the first pivotal direction outward from the side wall in the second pivotal position;

DETAILED DESCRIPTION

It is to be understood that the detailed figures are for purposes of illustrating exemplary embodiments only and are not intended to be limiting. Additionally, it will be appreciated that the drawings are not to scale and that portions of certain elements y be exaggerated for the purpose of clarity and ease of illustration.

In accordance with the present disclosure, an enclosure and a method of installing an enclosure are provided for the efficient installation of a human machine interface (HMI) within an associated wall in a location requiring a controlled atmosphere. The enclosure can be used to reduce the risk of uncontrollable accumulation of moisture and unwanted air particulate therein. Additionally, a clamping mechanism is provided on the enclosure to allow for efficient replacement and maintenance of a device contained within the associated wall of the controlled atmosphere.

Figure 1:
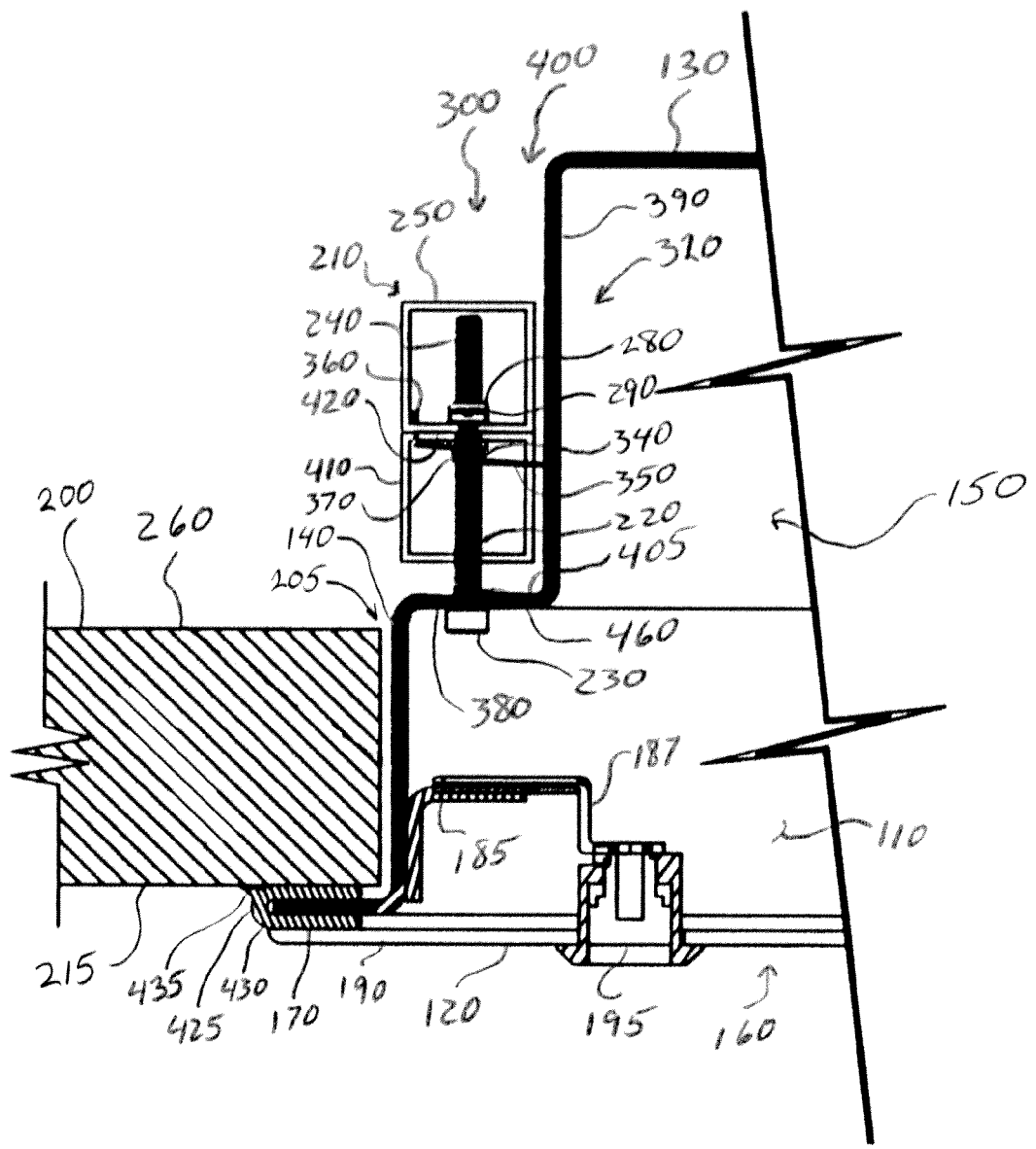
FIG. 1 is a cross sectional view of a wall mount enclosure for mounting in a wall opening of an associated wall.
Figure 6:
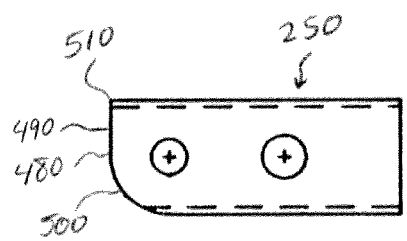
FIG. 6 is a top view of one embodiment of a clamp body of the clamping mechanism.
Figure 7:
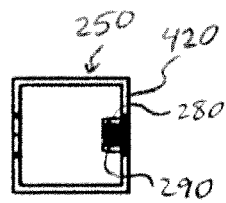
FIG. 7 is a side view of one embodiment of the clamp body of the clamping mechanism.
Figure 8:
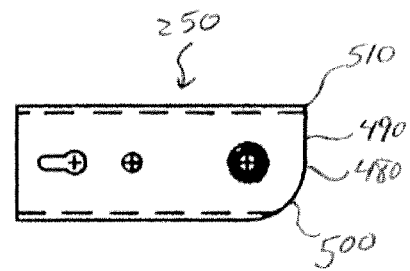
FIG. 8 is a bottom view of one embodiment of the clamp body of the clamping mechanism.
Figure 10:
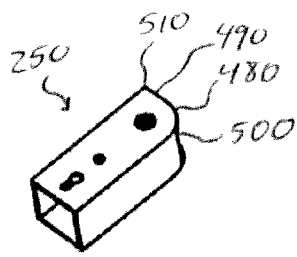
FIG. 10 is a perspective view of one embodiment of the clamp body of the clamping mechanism.
Figure 9:
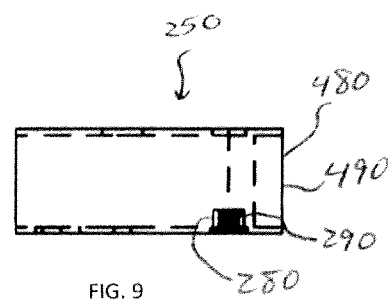
FIG. 9 is a front view of one embodiment of the clamp body of the clamping mechanism.

With reference to FIGS. 1-4, wall mount enclosure 100 is provided for mounting in a wall opening 205 or cutout of an associated wall 200 (FIG. 1). The enclosure 100 comprises a housing 110 having a front side 120, a back side 130 and at least one side wall 140. The side wall 140 extends between the front side 120 and the back side 130 and defines an interior 150 or cavity that is accessible from an opening 160 in the front side 120. The front side 120 has an outer perimeter 170 with at least a portion thereof extending outwardly beyond the side wall 140 to interface with a front surface 215 of the associated wall 200 when the housing 110 is installed in the wall opening 200.

In one embodiment, the wall mount enclosure 100 is provided with four side walls 140 positioned between the front side 120 and back side 130 defining a generally rectangular interior 150, where the enclosure 100 itself also has a generally rectangular shape. Other embodiments are contemplated in which the enclosure may comprise any shape as may be needed by the particular application or design.

As shown in FIGS. 2 and 5, the wall mount enclosure 100 in one example is provided with a human machine interface 105 having a display 115 or monitor and an input device 125 or keypad accessible from the front side 120 by an associated user. The display 115 and input device 125 may also be combined into a touch-screen type apparatus. However, the wall mount enclosure 100 may contain other devices or items that may be beneficial for use or storage in a controlled atmosphere.

Optionally, at least one electrical port 180 extends from the enclosure for operable connection to an associated power supply. In one embodiment the electrical port 180 extends from back side 130 to allow the HMI device or other enclosed device to connect to an associated power supply and/or to an associated data/server line.

The opening 160 is provided at the front side 120 for access to the interior 150. A cover 190 may be provided over the opening 160 to prevent unwanted access by associated users and/or ingress or egress of foreign particulates. A plurality of latches 195 may be provided about the circumference of the cover 190 to lock the cover 190 over the opening 160 and compress the cover 190 about the outer perimeter 170 of the front side 120. In one embodiment, a gasket 430 can be placed between the cover 190 and the outer perimeter 170 to provide a sufficiently closed seal. Each latch 195 can be opened by a proprietary key or by rudimentary latching means known in the art. In the embodiment illustrated in FIG. 1, a quarter turn latch 195 is provided where an arm 187 is operatively rotated in abutting position with an internal flange 185. Latches are commonly known in the art and will not be explained fully herein. However, it should be noted that any type of latch may be acceptable for attaching the cover 190 to the front side 120 so long as it locks the cover 190 and conceals the opening 160 to prevent unwanted access by associated users and/or foreign particulate.

In another embodiment, the cover 190 may comprise a hinged opening (not shown) with at least one latch 195 whereby at least one hinge is located in a spaced relation to the front side 120 and the opening 160. In this arrangement, the at least one hinge is oriented to move the cover 190 outwardly before pivoting the cover 160 open to prevent crimping the gasket 430 therein. The hinge or hinges are spaced relative to the front side 120 to maintain the integrity of the sealed arrangement of the gasket 430 between the cover 190 and the interior 150 when the cover 190 is in a closed position.

In one embodiment, as shown in FIGS. 1 and 3-5, a plurality of clamping mechanisms 210 are mounted to the enclosure 100 and are operative to mount the enclosure 100 to the associated wall 200. The clamping mechanisms 210 in the illustrated example individually include a clamp body 250 and a threaded fastener 220 having a head 230 accessible through the interior 150 of the enclosure 100, and an at least partially threaded elongated member 240. The head 230 can be arranged for manual rotation by an associated user or can be shaped to receive an associated tool for the transfer of a torque force. The elongated member 240 includes a generally cylindrical body 270 and a plurality of threads 275 located substantially along an exterior of the cylindrical body 270.

In one embodiment, the clamp body 250 is pivotal about an axis by the rotation of the threaded fastener 220 in a first rotational direction for movement of at least a portion of the clamp body 250 in a first pivotal direction away from the interior 150 of the enclosure 100. The clamp body 250 can be pivoted between a first pivotal position 300 (See FIG. 1) in which the clamp body 250 is entirely located inward of the side wall 140 and a second pivotal position 310 (See FIGS. 16-18 and 20-24) in which at least a portion of the clamp body 250 is outward of the side wall 140.

The clamp body 250 is translatable when in the second pivotal position 310 by continued rotation of the threaded fastener 220 in the first rotational direction. The clamp body 250 translates between an extended position 320, in which the clamp body is spaced from the associated wall 200, and a retracted position 330, in which the clamp body 250 operatively engages a back portion 260 of the associated wall 200, to compressively mount the housing 110 to the associated wall 200.

With reference to FIG. 1, the clamp body 250 of the clamping mechanism 210 is shown in the first pivotal position 300. In this embodiment, the clamp body 250 is threadingly attached to the threaded fastener 220 along a shared pivotal axis. However, it should be appreciated that the threaded fastener 220 and clamp body 250 may each have a separate axis whereby a mechanical linkage arrangement (not shown) may be adapted to transfer torque and pivotal movement from the threaded fastener 220 to the clamp body 250 for pivotal motion and translation of the clamp body 250 relative to the enclosure 100 in a predetermined pathway.

As shown in FIG. 1, the threaded fastener 220 in the illustrated embodiments is threadingly adapted to a lock nut 280 that is fixedly attached to clamp body 250. The lock nut 280 comprises a standard threaded nut, shaped to receivingly engage threads 275 located along the elongated member 240 of threaded fastener 220. Additionally, the lock nut 280 may have a nylon insert 290 shaped to engage the threads 275 along the elongated member 240. Threads may be molded into the nylon insert 290 for additional frictional engagement between the lock nut 280 and the elongated member 240. Nylon lock nuts are known to provide a stable threaded connection about threaded members and act to further prevent loosening by vibration or unintended movements of the threaded fastener. In use, a torque force is applied in the first rotational direction to the threaded fastener 220 in order to pivot the clamp body 250 from the first pivotal position 300 to the second pivotal position 310. The clamp body 250 is then obstructed by an abutment surface 480 that restricts the pivotal motion of the clamp body 250 in the first pivotal direction. Continued torque force is applied to the threaded fastener 220 in the first rotational direction whereby the torque force overcomes the frictional force of the lock nut 280 (and the nylon insert 290 optionally therein). Once the torque force exceeds the frictional force of the lock nut 280 while the clamp body 250 is in the second pivotal position 310, the threads 275 frictionally interact with the lock nut 280 and cause the clamp body 250 to linearly translate towards the back portion 260 of the associate wall 200 thereby compressively abutting the associate wall 200 in the retracted position 330.

Also provided with the illustrated clamping mechanism 210 is a resilient or biasing member 295. The biasing member 295 may comprise any counterforce bearing member that provides a predetermined amount of force counter to the rotation of the clamp body 250 in the first pivotal direction thereby urging the clamp body 250 towards the interior 150 of the enclosure 100 in the second pivotal direction. When at rest, the biasing member 295 acts against pivotal movement in the first pivotal direction of the clamp body 250 and urges the clamp body 250 inwards towards the enclosure 100 to rest in the first pivotal position 300 located entirely inward of the side wall 140.

In one embodiment, the biasing member 295 comprises a torsion spring 340 having a first arm 350 and a second arm 360 extending from a spring body 370. The spring body 370 is coaxially located about the elongated member 240. The first arm 350 extending therefrom is adapted to engage the housing 110. The second arm 360 is adapted to the clamp body 250. In use, a torque force applied in the first rotational direction to the threaded fastener 220 is to be greater than the pivotal counter-force provided by the biasing member 295 (but not exceeding the frictional force of the nylon insert 290) in order to pivot the clamp body 250 from the first pivotal position 300 to the second pivotal position 310. The biasing member 295 urges the clamping mechanism to the first pivotal position 300 to allow for efficient installation of the enclosure 100 within the wall opening 205 while avoiding interference with the associated wall 200. The biasing member 295 provides installation advantages for an enclosure having a large rectangular or oblong shape configured to support electrical equipment that is to be installed in a vertical wall when the installer only has access to a front side of the wall. The installer is capable of installing the enclosure, including heavy electrical components therein, without the assistance of a second installer.

As shown in FIGS. 1 and 3-5, side wall in the illustrated embodiment comprises a first side wall portion 140 extending from the front side 120 toward the back side 130 and defining a side wall perimeter, a second side wall portion 390 extending from the back side 130 toward the front side 120 and located entirely inward of the side wall perimeter as defined by continuous first side wall portion 140 with no portion of the first side wall portion 140 being laterally inward of any portion of the second side wall portion 390, and a third side wall portion 380 joining the first 140 and second side wall portions 140, 390. In one embodiment, the third side wall portion or shoulder 380 is generally continuous about a perimeter of the enclosure 100 and the second side wall portion or recess wall 390. The shoulder 380 and recess wall 390 are positioned between the front side 120 and back side 130. The clamping mechanism 210 is substantially located in a recess area 400 created by the shoulder 380 and recess wall 390. The recess area 400 ensures the clamp body 250 avoids interfering with the associated wall 200 during installation of the wall mount enclosure 100. Additionally, the recess area 400 is generally continuous along the perimeter of the enclosure 100. Due to the continuous area 400, separate cutouts within the enclosure 100 are not needed to surround each clamping mechanism thereby simplifying the manufacture of the enclosure. Further, the continuous area 400 improves the comprehensive structural rigidity of the enclosure 100 in an installed vertical condition in the associated wall. The clamp bodies can also be configured to rotate away from the first pivotal position 300 within the area 400 in either a clockwise or counterclockwise pivotal direction to the second position 310 outside the side wall 140.

Additionally, the clamp body 250 may be provided with or otherwise accept or accommodate provision of a clamp extension 410 at an engagement side 420 of the clamp body 250. The clamp extension 410 further extends the clamp body 250 towards the backside 260 of the associated wall 200. The clamp extension 410 may comprise a shape capable of fixingly adapting to the clamp body 250 to frictionally engage the back portion 260 when the clamp body 250 is placed in the retracted position 330. The clamp extension 410 may be removable from the clamp body 205 and has a length that is dependent on the distance between a base 405 of the clamping mechanism 210 and the back portion 260 of the associated wall 200. Additionally, the clamp extension 410 is located in the recess area 400 along with the clamp body 250 when the clamping mechanism 210 is in the first pivotal position 300. The clamp extension 410 allows the enclosure 100 to be installed with the clamping mechanisms 210 in associated walls 200 having a variety of different wall thicknesses.

In certain embodiments, the outer perimeter 170 of the front side 120 further comprises the gasket 430 to sealingly engage the front surface 215 of the associated wall 200 when the clamping mechanism 210 has engaged the back portion 260 thereof. Additionally, a user can optionally install the enclosure 100 within the wall opening without a gasket 430 and utilize a bead of caulk at the intersection of the front side 120 and the outer perimeter 170 for a sealing engagement. The gasket 430 and/or caulk in certain embodiments may comprise an elastomeric material that is capable of providing a sealed arrangement between the wall opening 205 and the controlled environment. The gasket 430 may also have a tail member 435 extending along a peripheral edge 425 of the gasket 430 to further sealingly engage the front surface 215 of the associated wall 200 when the clamping mechanism 210 engages the back portion 260 of the associated wall 200. When the gasket 430 is compressed along the front surface 215 and the outer perimeter 170, as illustrated in FIG. 1, the cover 190 may also abut the gasket 430 along the outer perimeter 170 thereby further compressing the gasket 430 and creating a sealed arrangement between the interior 150 of the enclosure 100 and the controlled environment. Alternatively, the cover 190 may also abut a separate gasket or caulk to create a closed sealed arrangement. Preferably, the gasket and/or caulk type has been approved by the Food and Drug Administration (FDA) for use in controlled atmospheres whereby unwanted moisture and air particulate is prevented from collecting in cracks or spaces between the outer perimeter 170 and the front surface 215 and the outer perimeter 170 and the cover 190, respectively. In the embodiment illustrated in FIG. 26, the cover 190 may include a bent or radial edge 550 that abuts the gasket 430. The radial edge 550 provides a conformed and compressed sealed fit about the perimeter of the cover 190 and the front surface 215 as the gasket 430 is received and compressed by the radial edge 550 about the outer perimeter 170. Optionally, the bent edge 550 may also contact the outer perimeter 170 at a nested portion (not shown) configured along the outer perimeter 170 of the housing 110. The nested portion in such embodiments may receive the bent edge 550 continuously along the perimeter 170 as the cover is in the closed position. The nested configuration improves the sealed configuration of the enclosure as the cover 190 is in the closed position.

Figure 11:
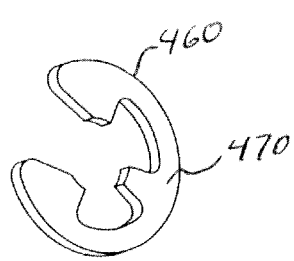
FIG. 11 is a perspective view of one embodiment of a retaining member of the clamping mechanism.
Figure 12:
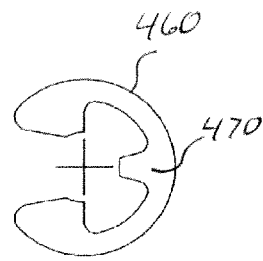
FIG. 12 is a top view of one embodiment of the retaining member of the clamping mechanism.
Figure 13:
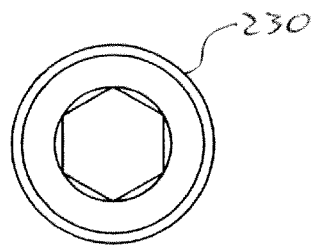
FIG. 13 is a top view of one embodiment of head of an elongated member of the clamping mechanism.
Figure 14:
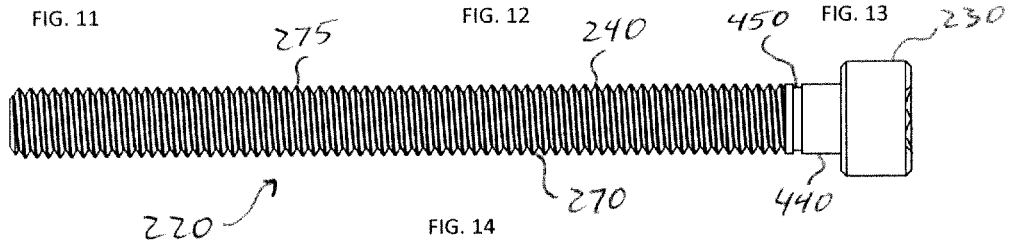
FIG. 14 is a side view of one embodiment of the elongated member of the clamping mechanism.

In one embodiment, the threaded fastener 220 remains captive about the enclosure 100 along an unthreaded portion 440 (See FIG. 14) of the elongated member 240. For this feature, a recess 450 is provided about the elongated member 240 to receive a restrictor plate 460 to engage the shoulder 380 of the enclosure 100 at the base 405. The restrictor plate 460 (See FIGS. 11 and 12) generally restricts axial movement of the threaded fastener as it abuts the base 405 opposite the head 230 of the threaded fastener 220 thereby allowing pivotal motion of the threaded fastener 220 while remaining captive about the housing 110. In one embodiment, the restrictor plate is an E-clip 470 that is removably adapted to fit within the recess 450 of the elongated member 240. Optionally, the base 405 of enclosure 100 may have an indented region (not shown) sized to accept a portion of the restrictor plate 460 along the shoulder 380 within recessed area 400.

Figure 25:
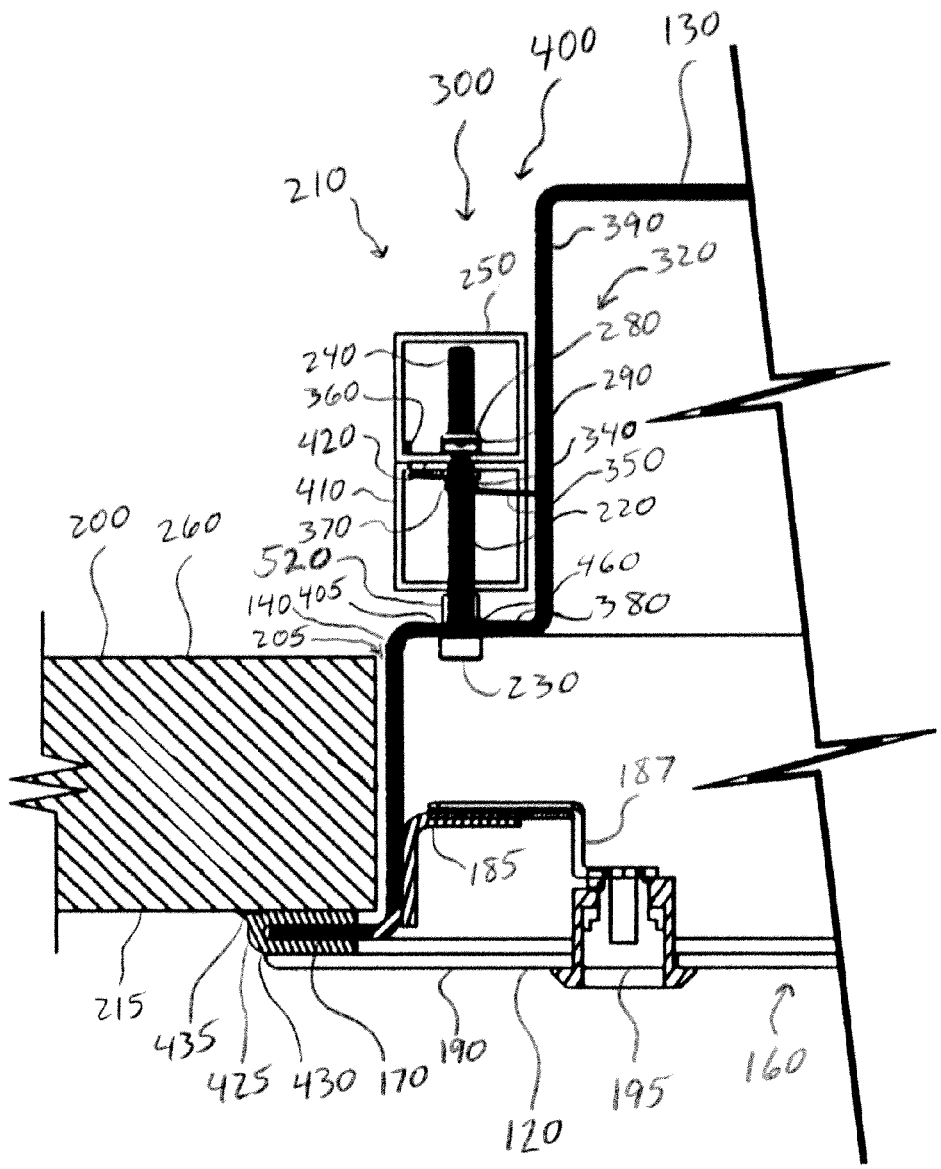
FIG. 25 is a cross sectional view of one embodiment of the wall mount enclosure for mounting in a wall opening of an associated wall.

In the embodiment illustrated by FIG. 25, an axial stabilizer 520 is provided about the housing 110. More particularly, the axial stabilizer 520 comprises a protrusion, such as a cylindrical member welded to the housing 110 or other structure shaped to provide axial stabilization of the clamping mechanisms 210 as they are located about the housing 110. The axial stabilizer 520 may be fixedly attached to the housing 110 and located at the interior 150 or recess area 400. The axial stabilizer 520 can be oriented in any shape so long as to structurally stabilize the threaded member 220 while it is located to prevent wobbling or other unwanted movements of the clamping mechanism 210. Additionally, the axial stabilizer 520 may be adapted to both the recess 450 and the restrictor plate 460 along the shoulder 380.

Figure 26:
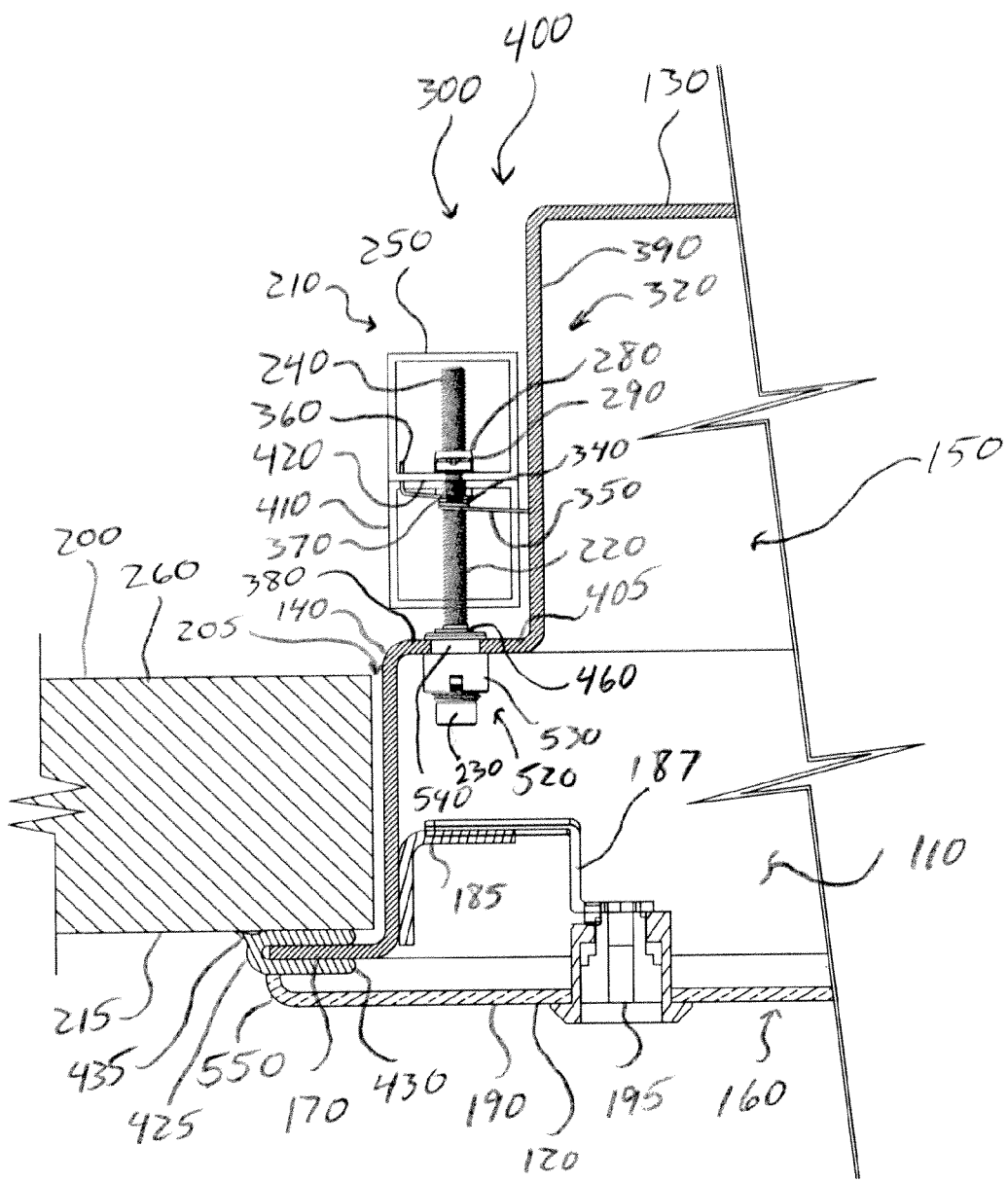
FIG. 26 is a cross sectional view of one embodiment of the wall mount enclosure for mounting in a wall opening of an associated wall.
Figure 27:
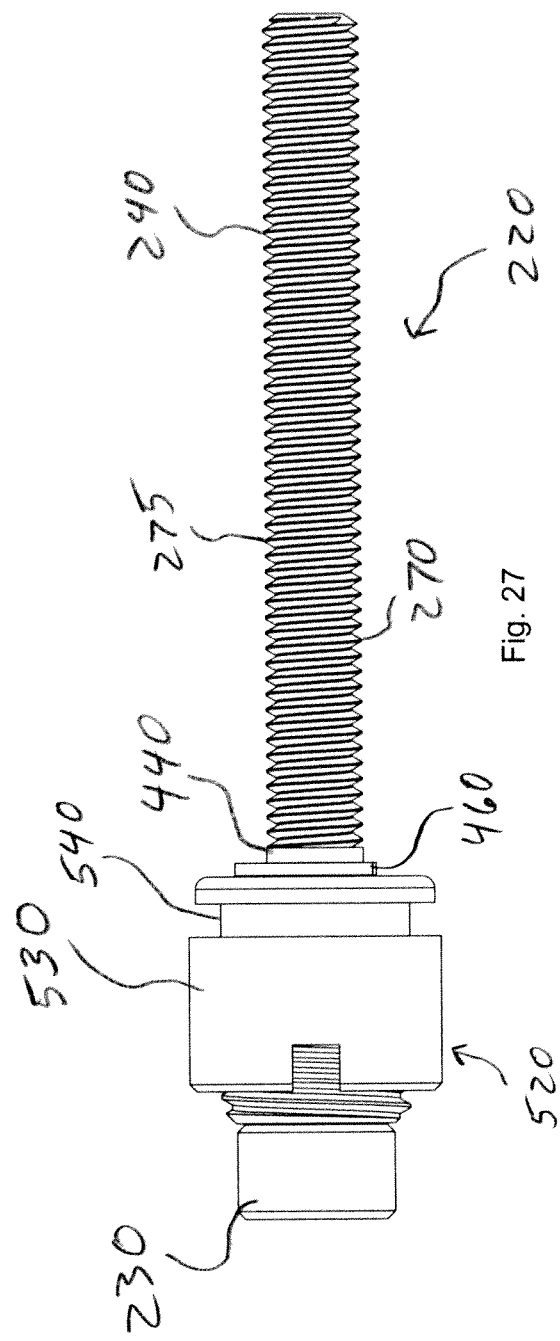
FIG. 27 is a side view of one embodiment of the elongated member of the clamping mechanism.

Additionally, the axial stabilizer 520 may be pivotally adapted to the elongated member 240 as illustrated in FIG. 26. Here, the axial stabilizer 520 comprises a bushing 530 attached to the threaded fastener 220 adjacent the head 230 and rotatably adapted to the sidewall 240. The bushing 530 may be a two part member that is fit about the side wall 240 of the housing 110 at a radial recess 540 for lateral support between the housing 110 and threaded fastener 220 while allowing pivotal rotation therein. In this embodiment, the bushing 530 is positioned along the unthreaded portion 440 of the threaded fastener 220 between the head 230 and recess 450. The restrictor plate 460 is received at recess 450 and abuts the bushing 530 to prevent axial translation of the threaded fastener 220 in relation to the housing 110, the bushing 530 and shoulder 380. The bushing 530 may be located within the housing 100 or at the recess area 400. FIG. 27 indicates the threaded member 220 of FIG. 26 whereby the bushing 530 is received by the elongated member 240 adjacent the head 230 along the unthreaded portion 440.

Stated another way, clamp body 250 is pivotal about an axis by the rotation of the threaded fastener 220 in the first rotational direction for movement of the clamp body 250 in a first pivotal direction away from the interior 150 of the enclosure 100. The clamp body 250 can be pivoted between a first pivotal position 300 (See FIG. 1) in which the clamp body 250 is entirely located inward of the side wall 140 and a second pivotal position 310 (See FIGS. 16-18 and 20-24) in which at least a portion of the clamp body 250 is outward of the side wall 140.

In one embodiment, as shown in FIGS. 19-24, the clamp body 250 is at rest in the first pivotal position. After a pivotal torque is applied to the threaded fastener 220 in the first rotational direction, the clamp body 250 pivots in the first pivotal direction until an abutment surface 480 is engages the housing 110 (See FIG. 24). The clamp body 250 is then translatable when in the second pivotal position 310, FIGS. 16-18 and 20-24, by continued rotation of the threaded fastener 220 in the first rotational direction. The abutment surface 480 is provided to engage the clamp body 250 to a portion of the housing 110 as the threaded fastener 220 is rotated thereby discontinuing a pivotal movement of the clamp body 250 in the first pivotal direction relative to the housing 110. The discontinued pivotal movement allows an associated user to overcome the frictional force of the lock nut 280 whereby the clamp body 250 begins linear translation about the threaded fastener 220 in a direction towards the back side 260 of the associated wall 200 after the clamp body 250 engages the abutment surface 480. As shown in FIGS. 6, 8, 10 and 19-24, the abutment surface 480 may be located at a first end 490 of the clamp body 250 and comprises a rounded edge 500 to pivot in relation to the recess wall 390 and a straight edge 510 to abut the recess wall 390 of the housing 110 thereby discontinuing pivotal movement of the clamp body 250 in the first pivotal direction. However, in a separate embodiment, the abutment surface 480 may additionally comprise an external obstruction or separate protruding element from the housing 110 that is attached to the housing 110 and shaped to engage the clamp body 250 when the clamp body 250 is pivoted at a predetermined angle relative to the housing 110.

In one embodiment, the abutment surface 480 discontinues pivotal movement of the clamp body 250 when the clamp body 250 is generally perpendicular or about 90 degrees in relation to the side wall 140 (See FIG. 24). However, the abutment surface can be arranged to discontinue pivotal movement of the clamp body 250 at any angular relationship with the side wall 140 as required by the size and shape of the housing 110 and wall opening 205. This configuration assists in overcoming the frictional force of the lock nut 280 while the clamp body 250 is in the second pivotal position 310. The lock nut 280 frictionally interacts with the elongated member 240 and causes the clamp body 250 to linearly translate towards the back portion 260 of the wall.

After the abutment surface 480 engages the recess wall 390, the clamp body 250 may then be translated between the extended position 320, in which the clamp body is spaced from the associated wall 200, and the retracted position 330, in which the clamp body 250 operatively engages a back portion 260 of the associated wall 200, to clampingly mount the housing 110 to the associated wall 200. This same pivotal action can be done to the plurality of clamping mechanisms 210 located about the periphery of the enclosure 100 to compress the gasket about the outer perimeter 170 to the first surface 215.

To disengage the enclosure 100 from the associated wall 200, an opposite directional torque force is applied to the head 230 of the threaded fastener 220. The force is applied in such second rotational direction whereby the clamp body 250 disengages from the back portion 260 of the associated wall 200 and linearly translates about the threaded fastener 220 towards the extended position 320. The resilient member 295 continually acts against pivotal movement in the first pivotal direction of the clamp body 250 and urges the clamp body 250 inwards towards the enclosure 100 until the clamp body 250 rests in the first pivotal position 300 located entirely inward of the side wall 140. Further, clamp extension 410 may contact the side wall 140 below the shoulder 380 as the resilient member and the second rotational direction would act to pivot the clamp body towards the enclosure 100. In this instance, continued rotation of the threaded fastener 220 in the second rotational direction is required to fully linearly translate the clamp body 250 to the extended position 320 and come to rest in the first pivotal position 300 located entirely inward of the side wall 140 in the recess area 400.

The various aspects of the disclosure have been described with reference to one or more preferred embodiments. Modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A wall mount enclosure for mounting in a wall opening of an associated wall, the enclosure comprising:
   a housing comprising a front side, a back side and at least one side wall extending between the front side and the back side and defining an interior that is accessible from an opening in the front side, the side wall comprising a first side wall portion extending from the front side toward the back side and defining a side wall perimeter, a second side wall portion extending from the back side toward the front side and located entirely inward of the side wall perimeter, with no portion of the first side wall portion being laterally inward of any portion of the second side wall portion, and a third side wall portion joining the first and second side wall portions, the front side having an outer perimeter with at least a portion of the outer perimeter extending outwardly beyond the at least one side wall to interface with a front surface of the associated wall when the housing is installed in the wall opening; and
   a plurality of clamping mechanisms mounted to the enclosure outward of the second side wall portion and operative to mount the enclosure to the associated wall, at least one of the clamping mechanisms comprising:
      a threaded fastener having a head accessible through the interior of the enclosure, and an at least partially threaded elongated member,
      a clamp body pivotal about an axis by rotation of the threaded fastener in a first rotational direction for movement of at least a portion of the clamp body in a first pivotal direction away from the interior of the enclosure between a first pivotal position in which the clamp body is entirely located inward of the side wall perimeter and a second pivotal position in which the clamp body is at least partially outward of the side wall perimeter, the clamp body being translatable when in the second pivotal position by continued rotation of the threaded fastener in the first rotational direction between an extended position in which the clamp body is spaced from the associated wall and a retracted position in which the clamp body operatively engages a back portion of the associated wall to mount the housing to the associated wall, and
      a biasing member operative to pivotally urge the clamp body toward the first pivotal position.

2. The wall mount enclosure of claim 1, further comprising a lock nut rigidly connected to the clamp body to engage at least some threads of the elongated member.

3. The wall mount enclosure of claim 2, wherein the lock nut comprises a threaded nut with a nylon insert to engage at least some threads along the elongated member.

4. The wall mount enclosure of claim 1, wherein the elongated member includes a recess, and the at least one clamping mechanism comprises a restrictor plate received in the recess to at least partially restrict axial motion to keep the fastener captive to the enclosure while allowing rotational motion of the threaded fastener.

5. The wall mount enclosure of claim 1, wherein an axial stabilizer is attached to the housing about the clamping mechanism to prevent the clamping mechanism from wobbling.

6. The wall mount enclosure of claim 5, wherein the axial stabilizer is attached to the third side wall portion of the housing.

7. The wall mount enclosure of claim 1, wherein the at least one clamping mechanism accommodates a clamp extension at an engagement side of the clamp body extending the clamp body towards the back portion of the associated wall.

8. The wall mount enclosure of claim 1, wherein the biasing member causes the clamp body to contact the second side wall portion to make an audible sound when the threaded fastener is rotated in a second pivotal direction to retract the clamp body to the first pivotal position.

9. The wall mount enclosure of claim 1, wherein the clamp body includes an abutment surface configured to prohibit continued pivotal motion of the clamp body relative to the enclosure.

10. The wall mount enclosure of claim 9, wherein the clamp body begins linear translation relative to the threaded fastener in a direction towards the back portion of the associated wall after the abutment surface engages the enclosure.

11. The wall mount enclosure of claim 10, wherein the clamp body engages the abutment surface at a 90 degree angle relative to the enclosure.

12. The wall mount enclosure of claim 1, wherein a cover is configured to conceal the opening of the front side of the housing, the cover having a radial edge configured to provide a conformed or compressed sealed fit between a perimeter of the cover and the front surface.

13. A method of connecting a wall mount enclosure to an associated wall, the method comprising:
   providing a cutout in the associated wall, the cutout sized to accept a housing having a front side and a back side and at least one side wall, the side wall extending between the front side and the back side defining an interior accessible through an opening in the front side, the front side having an outer perimeter extending outwardly beyond the at least one side wall;
   placing the housing within the cutout, the outer perimeter engaging at least a portion of a front surface of the associated wall;
   pivoting a plurality of clamping mechanisms disposed on a continuous shoulder from a first position inward of the side wall to a second position outward of the side wall, the continuous step platform of the housing located inwardly of the side wall;
   linearly translating a clamp body of the clamping mechanism from an extended position to a retracted position until the clamp body abuttingly engages a back portion of the associated wall; and compressing at least a portion of the associated wall between at least a portion of the outer perimeter of the front side and the clamp body.

14. The method of claim 13 further comprising pivoting the clamping mechanisms until an abutment surface on a body of the clamping mechanism contacts the housing by which continued rotation of a threaded fastener causes the body to linearly translate from an extended position to a retracted position.

15. The method of claim 13 further comprising pivoting the plurality of clamping mechanisms while overcoming a biasing force acting to pivotally urge the clamping mechanisms towards the housing.

* * * * *